US005404588A

United States Patent [19]

Henze

[11] Patent Number: 5,404,588

[45] Date of Patent: Apr. 4, 1995

[54] RDS RECEIVER WITH IMPROVED ALTERNATE FREQUENCY SWITCHOVER

[75] Inventor: Werner Henze, Harzer Weg 5, D-3053 Hohnhorst, Germany

[73] Assignee: Werner Henze, Hannover, Germany

[21] Appl. No.: 207,894

[22] Filed: Mar. 7, 1994

Related U.S. Application Data

[63] Continuation of Ser. No. 822,304, Jan. 17, 1992, abandoned.

[30] Foreign Application Priority Data

Feb. 1, 1991 [DE] Germany ........................ 41 03 062.1

[51] Int. Cl.[6] ........................ H04B 1/16

[52] U.S. Cl. ........................ 455/186.1; 455/45; 455/161.2; 455/152.1

[58] Field of Search ........................ 455/38.1, 45, 761.1, 455/761.2, 185.1, 186.1, 186.2, 187.1, 152.1, 345

[56] References Cited

U.S. PATENT DOCUMENTS 5,222,254 6/1993 Verron et al. .................... 455/186.1

FOREIGN PATENT DOCUMENTS

3443859A1 6/1985 Germany .
3832455A 7/1989 Germany .
0204529 8/1989 Japan .................... 455/186.1
0264018 10/1989 Japan .................... 455/186.1
2208767 4/1989 United Kingdom .

OTHER PUBLICATIONS

Derwent WPI English-language abstract of DE-OS 38 32 455, KASA.

Patent Abstracts of Japan, vol. 13, No. 270 (E-776), 21 Jun. '89, abstracting Sasaki/Fujitsu JP-A-10 60 115 of 7 Mar. 1989, entitled "RDS Radio Receiver."

Patent Abstracts of Japan, vol. 13, No. 433 (E-823), 27 Sep. '89, abstracting RYU/Pioneer JP-A-11 60 223 of 23 Jun. 1989, entitled "Method for Checking Receiving Signal Level in RDS Receiver."

*Primary Examiner*—Reinhard J. Eisenzopf
*Assistant Examiner*—Chi H. Pham
*Attorney, Agent, or Firm*—Milton Oliver; Justus Funke

[57] ABSTRACT

In a radio receiver having a device for decoding radio data signals, which are divided into groups each with a predetermined number of bits and contain a program identification code, and having a device for switchover for switchover from a received frequency to an alternative frequency, by briefly switching over to the alternative frequency, a plurality of data samples are taken from various groups and at various times within the groups of the radio data signal that is received at the alternative frequency. The data samples are compared with a program identification code stored in memory.

13 Claims, 4 Drawing Sheets

RDS RECEIVER WITH IMPROVED ALTERNATE FREQUENCY SWITCHOVER

This is a Continuation of application Ser. No. 07/822,304, filed Jan. 17, 1992, now abandoned.

Cross-Reference to related patents and applications assigned to BlaupunktWerke GmbH or its parent Robert Bosch GmbH, the disclosures of which are hereby incorporated by reference: U.S. Pat. No. 4,862,513, BRAGAS, issued Aug. 29, 1989, entitled radio receiver with two different traffic information decoders.

1. Field of the Invention

The invention relates generally to a radio receiver having a device for decoding radio data signals, which are divided into groups each with a predetermined number of bits and contain a program identification code, and having a device for switching over from one received frequency to an alternative frequency.

2. BACKGROUND

In known radio receivers with a device for decoding Radio Data System (RDS) signals—hereinafter called RDS receivers—in particular car radios, a check is made from time to time as to whether Program Identification codes—hereinafter called PI codes—of an alternative frequency (AF) received on a test basis match those of the particular frequency received. An automatic switchover to alternative frequencies while still receiving the same program can thus be done automatically. In the known RDS receivers, this check requires a period from 150 ms to 300 ms, and this leads to annoying crackling, because for the period of the test no audio signal from the received frequency is available.

The reason for this period is that after the frequency Phase-Locked Loop (PLL) tunes to the alternative received frequency, the bit synchronization of the radio data signal, the block and group synchronization, and then reading in of the entire radio data signal to a microcomputer must be done, so that a finding can then be made by comparison as to whether the same program identification code is contained in the radio data signal.

When two reception parts are used, this crackling or annoying pauses can indeed be avoided. However, this involves a substantially greater technological effort and moreover leads to less sensitivity, because the antenna signal is split into two input stages.

THE INVENTION

A primary object of the present invention, in an RDS receiver, is to enable checking of alternative frequencies for the presence of a program identification code in such a way that reception of the particular station selected is not impaired.

The invention provides that by switching briefly over to the alternative frequency, a plurality of data samples of various groups, at various times, within the groups of the radio data signal that is received on the alternative frequency are taken, and these samples are compared with a program identification (PI) code stored in memory.

The radio receiver according to the invention has the advantage that despite a low expense for only one receiving part and the attendant good utilization of the antenna signal, a check of the program identification code at alternative frequencies without the above-described problems is possible. The interruptions in reception required for the check in the radio receiver according to the invention last approximately 20 ms to 30 ms and are not perceived as annoying. The total period of time for all the interruptions required for testing in the radio receiver according to the invention may be greater than the interruption in the known radio receiver, but the brief interruptions are distributed over the total time in such a way that they do not actually become annoying.

A further feature of the invention provides that data samples that contain an RDS data bit sequence are taken from different groups at matching times within the groups of the data signal. This utilizes the fact that the program identification code is present in each group of the radio data signal. If the data samples taken in accordance with this further feature are different, then either they are not parts of the program identification code, or a transmission error is present for at least one of the data samples. This makes it possible to avoid a further time-consuming check.

Along the lines of the invention, by suitably staggering the switchovers over time, it is also possible for all the bits belonging to the RDS signal to be received and written into a microcomputer. It is true that the entire code, including the check bits, is then available for the evaluation. However, regardless of whether the program identification code is present, a great number of data samples are necessary. In the further feature that follows, however, it is already found that after possibly very few data samples that the program identification code sought is not transmitted at the alternative frequency.

In this further feature, a check is already made after a first data sample is taken as to whether the bit sequence contained in the data sample is contained in the memorized program identification code;

if applicable, a data sample chronologically adjacent to the first data sample is taken from one of the following groups of the radio data signal;

a check is made as to whether the bit sequence obtained from the first and the further data sample is contained in the memorized program identification code;

if applicable, further chronologically shifted data samples are taken until the entire program identification code is checked;

after a finding that the applicable bit sequence is not contained in the memorized program identification code, further data samples each with a predetermined chronological offset are taken and the bit sequence is compared again each time with the memorized program identification code; and this process is repeated up to a predetermined time limit, and after the time limit is exceeded, the program identification code of the received frequency and of the alternative frequency are considered to be non-identical.

DRAWINGS

DETAILED DESCRIPTION

Figure 1:
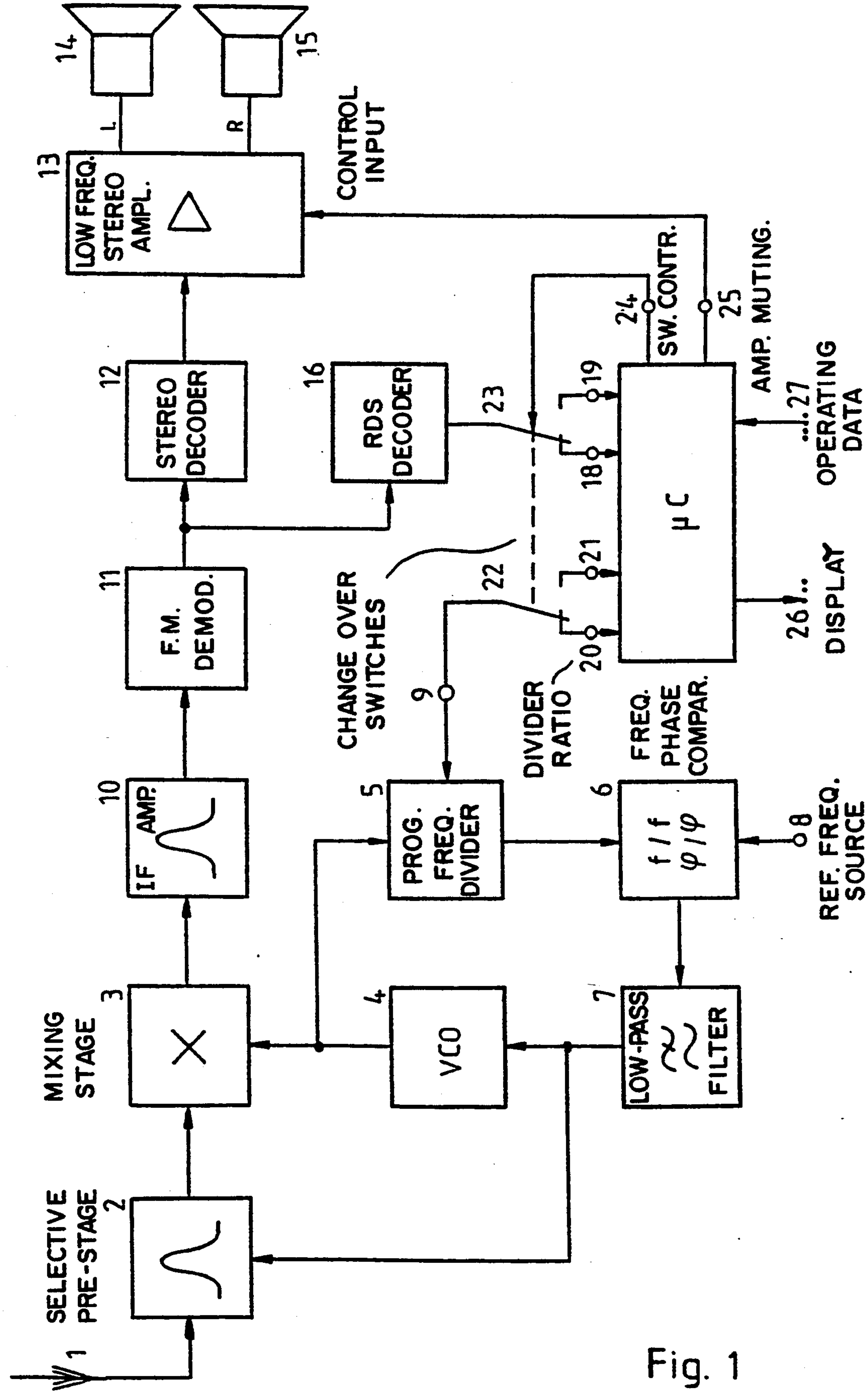
FIG. 1 is a block circuit diagram of a first exemplary embodiment.

Identical elements are provided with the same reference numerals in all the drawing figures.

In the radio receiver of FIG. 1, the signal received by the antenna 1 is first delivered to a selective prestage 2 and an amplified form reaches the mixing stage 3. Tuning is done with the aid of a frequency phase-locked loop (PLL), which comprises a controllable oscillator 4, a programmable frequency divider 5, a frequency-phase comparator 6 and a low-pass filter 7. A quartz-stable reference frequency is delivered at 8 to the frequency-phase comparator 6.

The structure and operation of a frequency phase-locked loop is known per se and therefore need not be described in further detail in the context of the present invention.

Via a control input 9 of the programmable frequency divider 5, the frequency of the controllable oscillator 4 can be specified. The tuning of the selective prestage 2 is done with the control voltage supplied to the controllable oscillator 4.

The output signal of the mixing stage is carried via an intermediate frequency (IF) amplifier 10 to the FM demodulator 11, at the output of which a multiplex signal (MPX) is available that contains the radio data signal in addition to the audio information. In a stereo decoder 12, the two audio signals L and R are generated, which are delivered to the loudspeakers 14, 15 via the low frequency (LF) stereo amplifier 13. An RDS decoder 16 derives the radio data signal from the multiplex signal.

For controlling the programmable frequency divider 5, or in other words for tuning the receiver, evaluating the radio data signal, and for other functions, a microcomputer 17 is provided; it has two inputs 18, 19 for the radio data signal. A divider ratio calculated by the microcomputer for the programmable frequency divider 5 is present at two outputs 20, 21. Two changeover switches 22, 23, which are controllable in the same direction, connect the input 9 of the programmable frequency divider 5 selectively to one of the outputs 20 or 21 and connect the output of the RDS decoder 16 to one of the inputs 18 or 19 of the microcomputer 17. The changeover switches are achieved practically by means of the microcomputer itself by software, so that only one input and one output each is necessary.

A further output 24 of the microcomputer 17 carries a signal for controlling the changeover switches 22, 23. One output 25 of the microcomputer 17 is also connected to a control input of the LF stereo amplifier 13 for the sake of muting. Further outputs 26 and inputs 27 of the microcomputer are merely suggested and serve for instance to output the radio data to a display device or for entering operating information. A program provided for the microcomputer effects the control and in particular the changeover of frequencies in terms of the times and duration, as well as the evaluation of the data samples described below.

Figure 2:
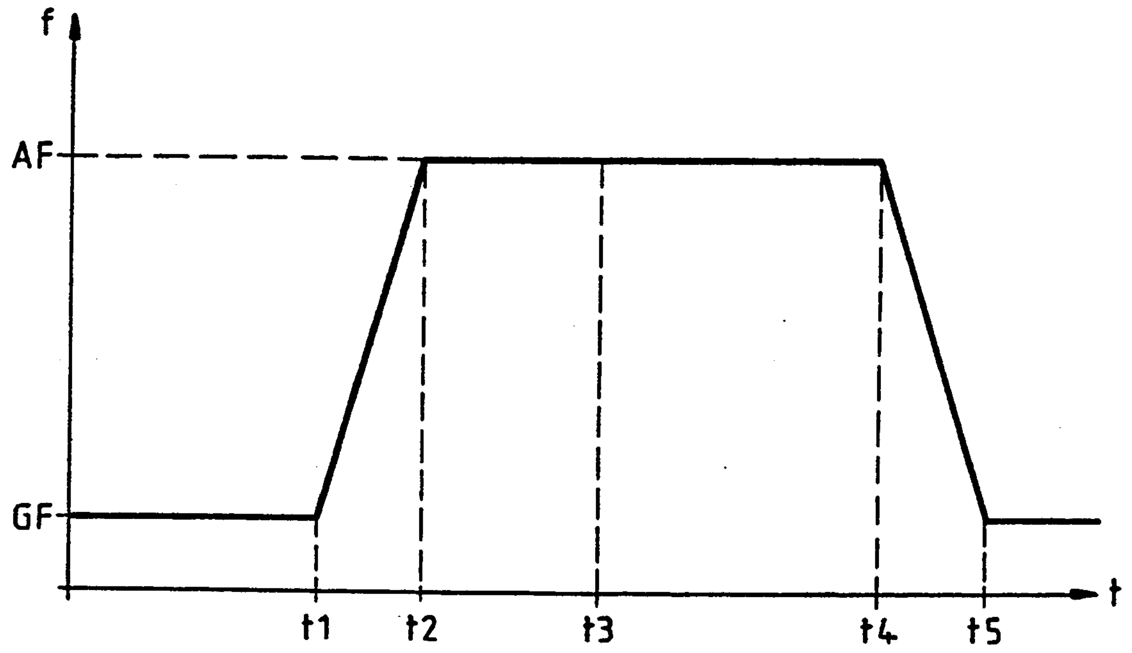
FIG. 2 is a timing diagram to explain the function of the first exemplary embodiment.

In normal reception of a transmitter—the frequency heard GF—the changeover switches 22, 23 are in the left-hand position, shown. The programmable frequency divider 5 is set in accordance with the GF by the microcomputer 17. The RDS decoder 16 furnishes the radio data signal to the microcomputer via the input 18, and the microcomputer evaluates it in a suitable manner, for instance for the display of data on a display device. In the search for an alternative frequency AF, with which the same PI code as with the frequency GF is transmitted, the microcomputer 17 switches the changeover switches 22, 23 to the right-hand position (time t1 in FIG. 2). Via the output 21 and the changeover switch 22, the programmable frequency divider 5 is now set to the divider ratio for the alternative frequency AF. Until time t2, the rise of the PLL to the frequency AF takes place. After that, bit synchronization in the RDS decoder 16 takes place, and this lasts until time t3. From time t3 on, the RDS decoder 16 sends radio data signals to the microcomputer 17 via the changeover switch 23 and the input 19.

At time t4 the microcomputer switches the changeover switch back to the left-hand position, so that the programmable frequency divider 5 is again set for receiving the frequency GF. After the settling time of the PLL elapses, the frequency GF is received again, from time T5 on.

Assuming a limitation of the interruptions in reception of the frequency GF, dictated by the check, to 20 ms to 30 ms and if a settling time of the PLL of approximately 3 ms to 7 ms is also taken into account, along with a duration of the bit synchronization of at least 10 ms, then approximately 4 to 8 bits can be received during the period of time between t3 and t4. The duration of bit synchronization may be greater because of a weak or interfered-with received signal, so that in this case the number of bits is at the lower limit. The data bits received upon each switchover to the frequency AF will hereinafter be called the data sample. The fewer bits are received in one data sample, the more samples have to be taken in order to come to some result.

Figure 5:
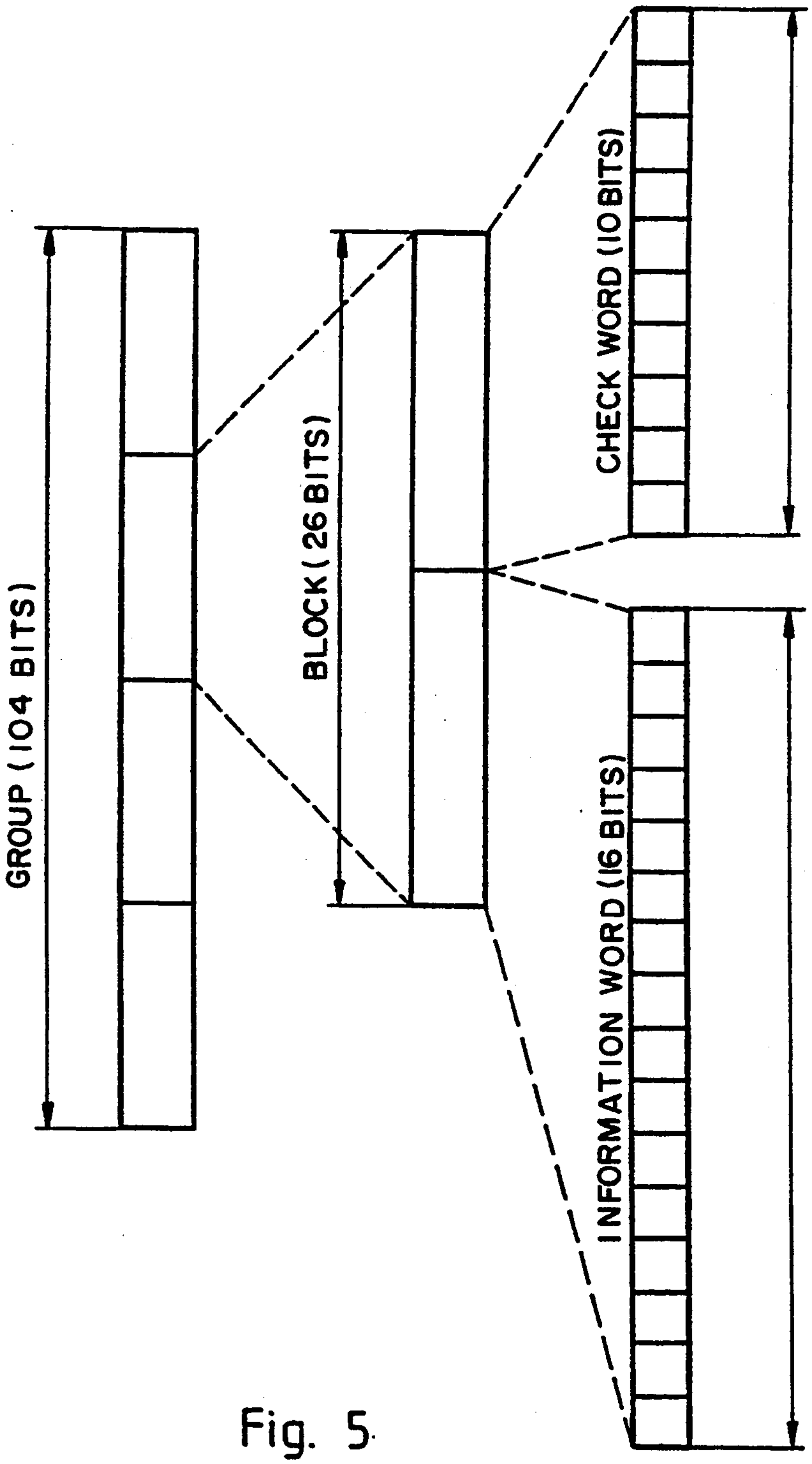
FIG. 5 is a schematic illustration of the radio data signal.

Before further details of the check are explained, the structure of the radio data signal will be explained, referring to FIG. 5. The largest element of the radio data is called a group and comprises 104 bits, which are transmitted at a frequency of 11.87.5 bits per second. Each group comprises four blocks of 26 bits each, of these, 16 bits belong to an information word and 10 bits belong to a check word.

Other details of the radio data signal and its decoding are described for instance in the aforementioned publication entitled "Specifications of the Radio Data System RDS for VHF/FM Sound Broadcasting", Tech. 3244-E, March 1964, published by the Technical Center of the European Broadcasting Union in Brussels.

One significant feature for explaining the invention is that some information varies from group to group, while other information, including the PI code, is repeated from one group to another. Accordingly if precisely 87.579 ms after a first, data sample, a further data sample is taken and the samples are not identical (condition 1), then the conclusion can be drawn that the data sample is not part of a PI code, or that at least one of the data samples involves a transmission error. In both cases, further evaluation of the data samples received is of no use. Instead, new data samples should be taken, at staggered times.

Regardless of this, however, it is already possible upon the reception of a first data sample to begin a check as to whether the data sample matches some part of the PI code of the frequency GF (condition 2).

Before the data sample is used further, both conditions must be met. If one of the two conditions is not met, then after each data sample, beginning at the time position of the first data sample, the reading period for the ensuing data sample is shifted to one side by one data bit (842.1 microsec.) or a multiple thereof. Because of the faster checkability and because the meeting of condition 2 immediately thereafter can often happen, the data sample is used to this end; that is, condition 2 should be met first.

The magnitude of the offset in the reading period is dependent on the number of bits of the data sample read and is continued until such time as condition 2 is met, or a predetermined time limit is attained. If the check is terminated without meeting condition 2, then the PI code in frequency code AF does not match that of the frequency GF. However, if the meeting of condition 2 is ascertained, then a check is made as to whether condition.1 is met as well. Since a complete block of the radio data signal is not received, however, the error ascertainment and error correction provided intrinsically in the decoding of the radio data signal cannot be utilized. In the context of the invention, condition 1 is therefore checked often enough that adequate certainty exists and the data sample can be used further.

If the repeated interruptions caused by this check after every four blocks should be perceived as annoying, then the check intervals can also be an integral multiple of the transmission duration of a group.

If conditions 1 and 2 can be considered to be met with adequate certainty, then it is certain that part of the PI code in the frequency GF matches the data sample. A check should now be made as to whether the rest of the code, to which the data sample belongs, matches the rest of the PI code of the frequency GF. Because of the coincidence ascertained thus far, it is already known how many bits chronologically before and after the data sample must be checked. To check the remaining bits, the number of positions in time of the data samples still needed is therefore calculated; the changeover switches 22, 23 (FIG. 1) are reset accordingly by the microcomputer 17, and finally a comparison of the received data samples with the memorized PI code (condition 2) is performed. If this condition and the aforementioned condition I are not met for one of the further data samples, then this check is ended and a new check is begun after a bit offset. Not until conditions 1 and 2 are met for all the additional data samples is it true that the PI code of the alternative frequency AF matches that of the frequency GF.

Figure 4:
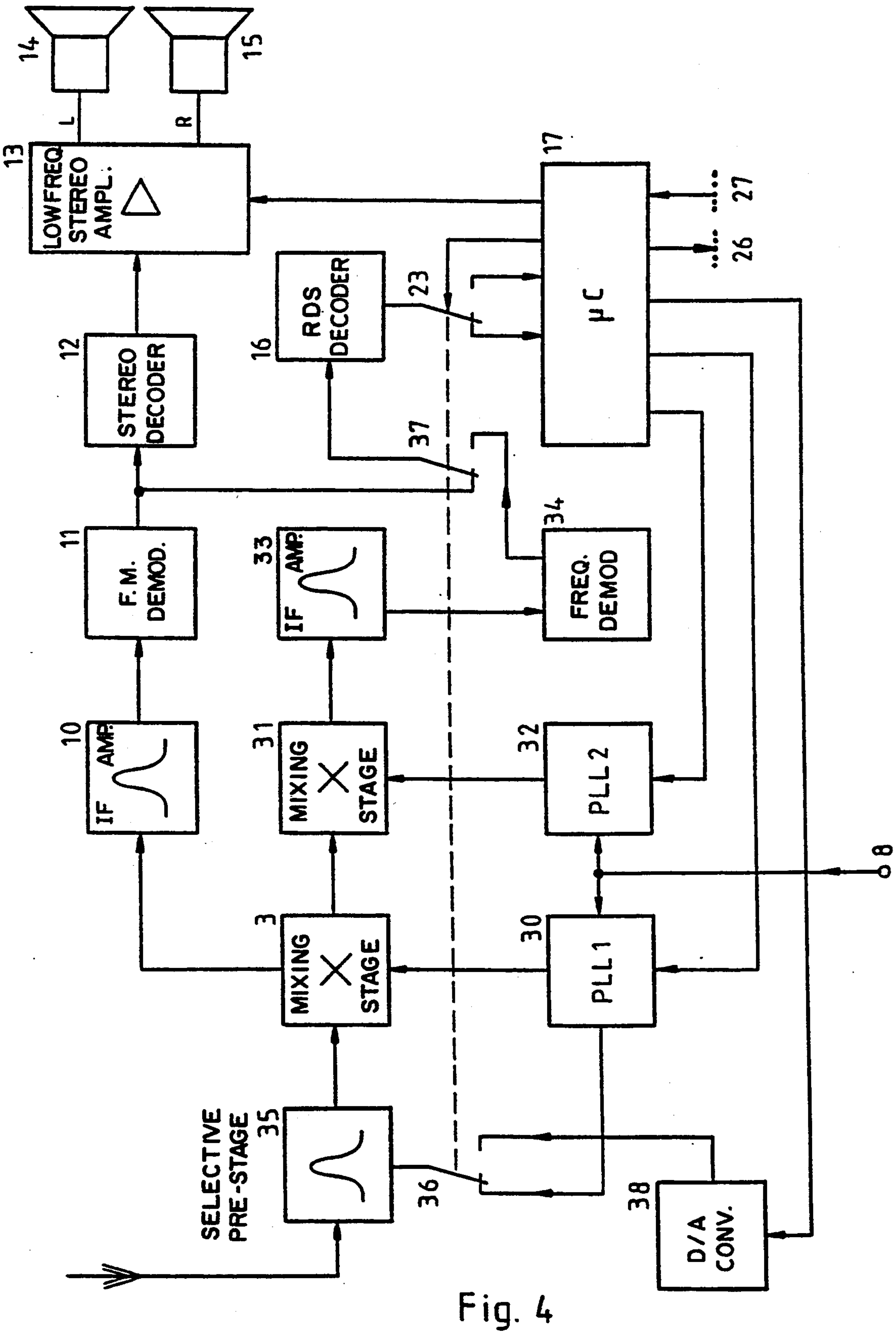
FIG. 4 is a block circuit diagram of the second exemplary embodiment.

In the exemplary embodiment shown in FIG. 4, which otherwise is identical to that of FIG. 1, an additional mixing stage 31, an additional frequency phase-locked loop 32, an additional IF amplifier 33 and an additional frequency demodulator 34 are provided, so that the receiver can be set from whichever frequency GF is received at a given time to an alternative frequency AF without a new transient effect of the frequency phase-locked loop 30 (elements 4–9 in FIG. 1). Only the selective prestage 35 is switched over to the alternative frequency AF, but this can be done very fast. To this end, the selective preselector stage 35 receives a control voltage, as a function of the position of a changeover switch controllable by the microcomputer 17, from either the frequency phase-locked loop 30 or from the microcomputer 17 via a digital/analog converter 38.

For receiving the radio data signal of the RDS decoder 16, a switchover to the second frequency demodulator 34 is also made with the aid of a changeover switch 37. The microcomputer 17 supplies one command value each to both frequency phase-locked loops 30, 32.

Figure 3:
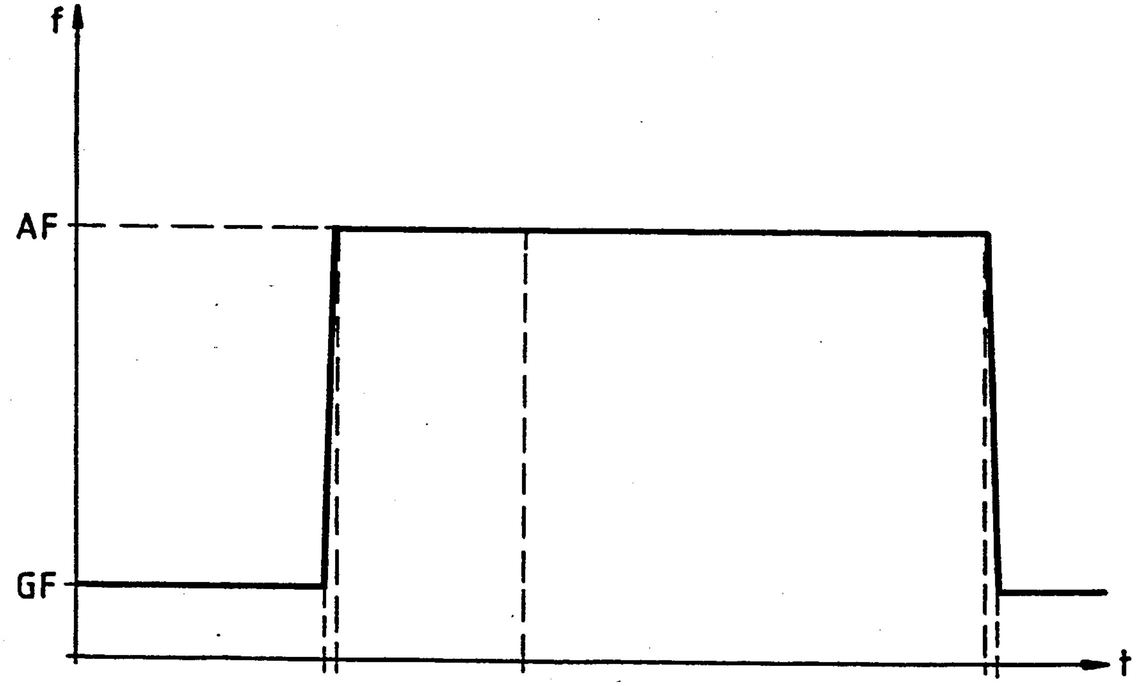
FIG. 3 is a timing diagram to explain the function of a second exemplary embodiment.

FIG. 3 shows the courses over time upon reception of a data sample with the receiver of FIG. 4. The transition from the frequency GF to the frequency AF and vice versa takes place in a substantially shorter time than with the receiver of Fig. 1. At the same time for the bit synchronization, a substantially longer time is available for receiving the data sample from the signal having the frequency AF; this can easily be seen from FIG. 3.

Since the clock frequency in both radio transmitters that transmit radio data signals and in the radio receivers is quite precise, it is also possible in the context of the invention to use the entire duration of the sampling reception, and optionally even a plurality of such time intervals, for the bit synchronization. The bit timing can then be derived from an internal clock rate, with the aid of a frequency phase-locked loop or of the microcomputer, and kept in accordance with the synchronization performed. Upon the next switchover to the alternative frequency AF, the entire reception duration of the alternative frequency is then available for reading the data sample. The reception of a data sample that is performed only for the sake of bit synchronization can be done at suitable times or at suitable time intervals, and the duration of one group need not be adhered to.

In the context of the invention it is possible instead of the PI code of the transmitter that has just now been listened to, to use some other PI code as a comparison value. This makes it possible, for instance, to enter the PI code of a chain of programs that cannot be received or cannot yet be received. As soon as the receiver is within range of a transmitter of this chain of programs, however, then an automatic switchover can take place. A switchover of this kind may also be linked to conditions, however, such as traffic radio identification signal or a massage identification signal.

A check for these identification signals can be done in a simple manner, with an unimpededly received frequency GF. Since because of the checking of the PI code the position of the PI code in time and thus the entire RDS time pattern of the alternative frequency AF is known, the TP (Traffic Program—see RDS specification, page 30) and TA (Traffic Announcement—see RDS specification, page 31) bits can be purposefully read by the microcomputer. For safety reasons, reading of the applicable bits should be done multiple times. It is also advantageous, after the recognition of the PI code in the alternative frequency AF, to monitor the bit synchronization and to follow it up as needed.

Various changes modifications may be made, and features described in connection with any one of the embodiments may be used with any of the others, within the scope of the inventive concept.

A suitable microprocessor for use in the circuit is model MC68HC11 manufactured or marketed by MOTOROLA A suitable Phase-Locked Loop is model SAA1057 manufactured or marketed by VALVO.

I claim:

1. A radio data system (RDS) receiver comprising
   a mixing stage (3);
   a first FM demodulator (11) connected to an output of said mixing stage (3);
   an RDS decoder (16) having an input, connected to an output of said FM demodulator, and an output;
   a first Phase-Locked Loop (PLL), including a divider (5), and having an output connected to said mixing stage (3); and a microcomputer (17) having at least one output (9) connected to a control input of said divider (5);

and wherein the output of said RDS decoder (16) is connected selectively to one of two inputs (18, 19) of the microcomputer (17), via a controllable changeover switch (23) controlled (24) by said microcomputer (17), to facilitate rapid checking of codes contained in RDS signals received at successively tuned different broadcast frequencies using a single demodulator and decoder.

2. The radio data system receiver of claim 1, wherein a selective pre-stage is provided, connected to one input of said mixing stage (3), and further comprising, for reception of an alternative frequency, a further mixing stage (31) connected to an output of said mixing stage (3), a further IF amplifier (33), said IF amplifier being connected in series with said further mixing stage (31), a second Phase-Locked Loop (32), said second Phase-Locked Loop being connected in series with said further mixing stage (31), and a further FM demodulator (34), said further FM demodulator being connected in series with said further IF amplifier (33);

wherein said first and second Phase-Locked Loops (30, 32) and said selective pre-stage (35) are tuned according to respective control signals from said microcomputer (17);

and wherein the input of said RDS decoder (16) is connected, selectively, to an output of said first FM demodulator (11) or to an output of said further FM demodulator (34) in accordance with a selection made (37) by said microcomputer.

3. In a radio receiver having a device (16) for decoding radio data signals, which signals are divided into groups, each with a predetermined number of bits and which contain a Program Identification (PI) code, and a switchover device (22,23,37) for switchover from a received frequency, to an alternative frequency, in order to identify a Program Identification code of a radio data signal transmitted on the alternative frequency, a method of identifying said PI code on the alternative frequency while limiting duration of each switchover to a period of time less than the duration of reception of a complete radio data signal group consisting of said predetermined number of bits, said method comprising the steps of:

limiting duration of each switchover from said received frequency to said alternative frequency to a limited period of time during which only a partial sample, of said radio data signal on said alternative frequency, can be taken, initiating switchovers at various times to take a plurality of data samples from various ones of said groups, and at various times within each group of the radio data signal, and comparing data samples taken with a Program Identification code stored in a memory in said receiver, for determining whether a match exists between said stored code and at least one of said samples.

4. The method of claim 3, furthermore comprising the steps of:

performing a first check already after a first data sample is taken, as to whether a bit sequence contained in said first data sample matches any bit sequence contained in said Program Identification code stored in said memory;

calculating a time frame necessary for receipt of the complete Program Identification code, taking a second data sample from a different data group than said first data sample, but within said calculated time frame;

performing a further check as to whether a bit sequence contained in said second data sample matches any bit sequence contained in said Program Identification code stored in said memory; and, if no match is found by said further check, repeating said steps of taking data samples and checking them until an entire Program Identification code has been checked, and if no match is found within a predetermined time period, establishing the conclusion, that the respective Program Identification codes of said received frequency and of said alternative frequency are non-identical.

5. The method of claim 3, furthermore comprising the steps of taking data samples from different groups also at the same times relative to the beginning and end of each group; and checking the taken samples for identity.

6. The method of claim 3, furthermore comprising the steps of performing a check as to whether the bit sequence contained in the data sample is contained in said Program Identification code stored in said memory in said receiver already after a first data sample is taken;

if said check is positive, taking a data sample chronologically adjacent to the first data sample from one of the following groups of said radio data signal;

performing a check as to whether the bit sequence obtained from the first and the second data sample is contained in said Program Identification code stored in said memory of said receiver;

if said second check is positive, further taking chronologically shifted data samples until the entire Program Identification code is checked; after one of these checks is negative, taking further data samples each with a predetermined chronological offset and checking again as to whether the respective bit sequence contained in the data sample is contained in the Program Identification code stored in said memory of said receiver; and repeating this process up to a predetermined time limit, and after exceeding the time limit, establishing the conclusion that the Program Identification code of the received frequency and of the alternative frequency are non-identical.

7. The method of claim 6, furthermore comprising the steps of taking at least one data sample at the same time relative to the beginning and end of each group as said first data sample and checking the two taken samples for identity, before carrying out the steps as defined in claim 3, and if said first data sample and the data sample taken at the same time from another group are non-identical, starting again.

8. The method of claim 3, furthermore comprising the steps of performing a bit synchronization prior to performing said switchover from a received frequency to an alternative frequency, generating a clock signal and using this clock signal for determining the timing of taking of said data samples relative to the beginning and end of each group.

9. The radio receiver of claim 3, wherein said limited period of time for switchover does not exceed 30 milliseconds.

10. The method of claim 13, furthermore comprising the step of storing the Program Identification code of the received frequency and using it as said Program Identification code stored in said memory of said receiver.

11. The method of claim 13, furthermore comprising the step of storing a Program Identification code other than the Program Identification code of the received frequency and using said other code as said Program Identification code stored in said memory of said receiver.

12. The method of claim 3, furthermore comprising the steps of performing switchover to said alternative frequency if said Program Identification code of said alternative frequency is identical with said Program Identification code stored in said memory of said receiver; and if said radio data signal indicates that predetermined information, in particular traffic radio-information, is broadcast.

13. The method of claim 3, furthermore comprising the step of switching the receiver to long term reception of the alternative frequency if the Program Identification code of said alternative frequency is identical to said Program Identification code stored in said memory of said receiver.

* * * * *